United States Patent [19]

Castro et al.

[11] Patent Number: 4,549,045

[45] Date of Patent: Oct. 22, 1985

[54] METHOD TO OPERATE THROUGH A TELEPHONE LINE ONE AUTOMATIC PHONE ANSWERING EQUIPMENT SPECIFIED AMONG A PLURALITY, AND APPARATUS TO CARRY IT OUT

[76] Inventors: Marcelo Castro; Horacio Castro, both of 5962 El Salvador St., Buenos Aires (1414), Argentina

[21] Appl. No.: 449,611

[22] Filed: Dec. 14, 1982

[30] Foreign Application Priority Data

Dec. 18, 1981 [AR] Argentina .............................. 287866

[51] Int. Cl.⁴ .............................................. H04M 1/64
[52] U.S. Cl. .................................. 179/6.03; 179/6.13; 179/6.16
[58] Field of Search .................... 179/6.01, 6.03, 6.11, 179/6.13, 6.16

[56] References Cited

U.S. PATENT DOCUMENTS 3,925,622 12/1975 Robinson ........................ 179/6.03 X
3,989,901 11/1976 Neuwirth et al. .............. 179/6.16 X Primary Examiner—Robert L. Richardson
Attorney, Agent, or Firm—Fleit, Jacobson, Cohn & Price

[57] ABSTRACT

A method and apparatus are provided to control a subscriber's phone system including, at least, one automatic telephone answering equipment. When a calling party dials the phone number of a subscriber whom he desires to call, the apparatus of this present invention shall close the d.c. loop, in response to which the calling party receives a ring-back signal. If the calling party does not send a pre-established code after receiving the ring-back signal, and after a predetermined period of time has elapsed, the phone line shall be automatically connected by this invention apparatus to the automatic phone answering equipment. But if he dials a pre-established code after the d.c. loop closes, the code shall be displayed on a displaying device, and at the same time an acoustic signal source will be activated advising the called party that he is receiving a call from someone who knows the preset code. By looking at the displaying device, the called party is able to recognize the code, thus enabling him to answer or not the call. If he attends the call, the automatic answering equipment shall not be connected to the phone line; but instead the called party phone set shall be connected, thus allowing him to answer the call in a normal mode. If he does not or cannot attend the call, for example for being absent, then after a certain period of time has elapsed, the automatic phone answering equipment shall be connected to the phone line.

26 Claims, 6 Drawing Figures

METHOD TO OPERATE THROUGH A TELEPHONE LINE ONE AUTOMATIC PHONE ANSWERING EQUIPMENT SPECIFIED AMONG A PLURALITY, AND APPARATUS TO CARRY IT OUT

BACKGROUND OF THE INVENTION

1. Field of the Invention

This invention relates to the telephone art and more specifically to the use of automatic phone answering equipments operable by means of preset codes.

2. Description of the Prior Art

The automatic phone answering equipment is a well known device in the phone art. However, known machines are all designed to automatically respond to any call being received by the phone line to which they are connected. The phone subscriber may or may not connect the machine to the phone line. But when he is present at the place and has the machine connected to the phone line, he can not know whether a call is being received or if the calling party is "desirable" or not. Every call shall be attended automatically by the machine. And if the machine is disconnected, then all calls shall activate the ringing bell of his phone set. Thus, it would be highly desirable to have a system through which it might be possible to know whether the calling party is desirable or not. However, if the called party is willing to attend the call, he might be able to do it and, if otherwise desired, then the automatic phone answering equipment would be automatically connected to the phone line. The same action would take place if he does not attend the call for being absent.

SUMMARY OF THE INVENTION

The invention is related to a phone system including, at least, one automatic phone answering equipment. However, the automatic answering equipment is not related on a usual mode with the phone line input terminals. The phone subscriber may give to certain people one or more special codes. One calling party having received from the subscriber said code and wishing to establish a communication with him, starts dialing the conventional phone number of the called party. When the apparatus of the present invention receives the ringing signal, it will automatically attend the line, closing the d.c. loop and sending the calling party one ring-back signal. After the calling party has received the ring-back signal, he dials the code, which is decoded by the apparatus and, if the decoded signal corresponds to one of the preset codes, it will advise the called party by ringing an audible warning signal indicating that a call has been received and, at the same time, it will display on a displaying device the code sent by the calling party. Thus, the called party is able to know who is calling him. If he wishes to attend the call, he unhooks the phone set of his phone equipment connecting it to the line, this action activating a relay which disconnects the whole electronic system from the line, thereafter being capable of establishing a conventional communication. If he does not wish to attend the call no action is taken. After a predetermined period of time has elapsed, the apparatus automatically activates the automatic phone answering equipment and connects it to the phone line and the calling party shall be advised thereof by the machine and the latter shall be able to record a message. The same thing happens if the call is not answered by the subscriber because he is absent.

If the code sent by the calling party is not one of the preset codes, or if no code is sent, and after a certain period of time has elapsed, the automatic answering equipment shall also be connected to the phone line and the apparatus will neither emit the audible warning signal nor display any code on the displaying device.

If the subscriber is willing to be in disposition of receiving any type of calls in the conventional way, he may operate a switch which deactivates the apparatus, his phone set remaining directly connected to the phone line.

In accordance with a more sophisticated embodiment of this invention, the same principles can be applied to one or more automatic answering equipments, one of which may attend certain "desired" special calls corresponding to one or more special codes, and others being capable of attending general calls corresponding to other less preferred codes or calls being accompanied by no codes at all.

In accordance with a still more sophisticated embodiment of this invention, the same principles can be applied to the use of a plurality of automatic answering equipments, for example: one shall attend calls not being accompanied by any code; another may attend calls followed by a corresponding code, for example, family calls; and others shall attend calls followed by a corresponding code, for example, business calls, etc.

In accordance with a first aspect of the method of the present invention, the same is characterized by the stages of:

(A) sending from the calling end of a phone line the characters corresponding to the called party phone number;

(B) detecting at the called end the ringing trains emitted by the phone exchange:

(C) closing automatically and electrically the d.c. loop on the called end, connecting in derivation with the phone line, one electric impedance means equivalent to the impedance offered on the phone line by a conventional phone apparatus which phone set has been unhooked;

(D) in response to the closing of the d.c. loop, sending automatically a confirmation tone from the called apparatus to the calling one;

(E) after the closure of the d.c. loop, and provided no code has been received, or else an incomplete code from the calling party, within a predetermined period of time, activating at the called end one automatic phone answering equipment and connecting it to the phone line, and, provided a code has been received from the calling party within said predetermined priod of time, emitting an audible warning signal if the received code is the preset one, and displaying said complete code received at the called end without yet connecting the automatic phone answering equipment;

(F) If, after a second predetermined period of time has elapsed, the called party has not attended the call, activating automatically the automatic phone answering equipment and connecting it to the phone line; finally (G) when another predetermined period of time has elasped, the called party not having answered, opening automatically the d.c. loop.

In accordance with another aspect of the above method, the same is characterized, after stages (A), (B), (C) and (D) have been accomplished, by the stages of:

(E) after the closure of the d.c. loop and provided no code has been received from the calling party within a predetermined period of time, or provided an incomplete one or a non-validated or non preset one has been received, activating at the called end a first automatic phone answering equipment and connecting it to the phone line, and if a code has been received from the calling party within said predetermined period of time, emitting an audible warning signal if the received code is a preset code, and displaying it at the called end without yet connecting any automatic phone answering equipment;

(F) if, when a second predetermined period of time has elapsed, the called party has not attended the call, activating automatically a second automatic phone answering equipment and connecting it to the phone line in response to the preset code received; and finally (G) when another predetermined period of time has elapsed, the called party not having answered, opening automatically the d.c. loop from the phone line.

In accordance with a third aspect of the method of our invention, the same is characterized, after steps (A), (B), (C), (D) and (E) have been accomplished, by the stages of:

(F) if after a second predetermined period of time has elapsed the called party has not answered the call, activating automatically one from a plurality of other automatic phone answering equipments and connecting it to the phone line, in accordance with the preset code which has been received; and finally (G) when another predetermined period of time has elapsed, the called party not having answered, opening automatically the d.c. loop from the phone line.

In order to carry out into practice the above mentioned method and to be able to operate through a phone line one automatic phone answering equipment specified among a plurality, the method makes use of a phone arrangement having at least one of these answering equipments. However, the automatic phone answering equipment is not related in the usual mode with the phone line input terminals.

The phone subscriber may give to certain people one or more special codes. One calling party who has received from the subscriber such code and wishes to establish a communication with him, starts dialing the conventional phone number of the called party. When the present invention apparatus receives the bell signal, it will automatically attend the line, closing the d.c. loop and sending to the calling party one ring-back signal. After the calling party has received the ring-back signal, it sends the code formed by rotary pulses, or multifrequencies, or single-frequency tones, or phonemes and/or combinations thereof, which is decoded by the apparatus, and if the decoded signal corresponds to one of the preset codes, it will advise the called party by ringing an audible warning signal, indicating that a call has been received and at the same time, it will display on a displaying device the code sent by the calling party. In that way, the called party is able to known who is calling him. If he wishes to attend the call, he deactivates a relay which disconnects the whole electronic system from the line, after which he can establish a conventional phone communication. If he does not wish to attend the call, he takes no action.

After a predetermined period of time has elaspsed, the apparatus automatically activates the automatic phone answering equipment and connects it to the phone line, and the calling party shall be advised thereof by the machine and the latter shall be able to record a message. The same thing happens if the call is not answered by the subscriber for being absent.

If the code sent by the calling party is not one of the preset codes, or if no code is sent, and after a certain period of time has elapsed, the automatic phone answering equipment shall also be connected to the phone line and the apparatus shall not emit the audible warning signal nor display any code on the displaying device.

If the phone subscriber wishes to be in disposition to receive any kind of calls in the conventional way, he may operate a switch which deactivates the apparatus, including the automatic phone answering equipment and, subsequently, he may connect his phone set directly to the phone line.

In accordance with a more sophisticated embodiment of this invention, the same principles could be applied to the use of two automatic phone answering equipments, one of which could attend certain special "desired" calls corresponding to one or more special codes, and the other being capable of attending general calls, corresponding to other less preferred codes or calls not having a code.

In accordance with a still more sophisticated embodiment of this invention, the same principles could be applied to the use of more than two automatic phone answering equipments, for example three, from which one at least will attend calls not followed by a ode, a second one may attend calls followed by a corresponding code, for example, family calls, and a third one may attend calls followed by a corresponding code, for example, business calls.

In accordance with a first aspect of this invention apparatus, the same comprises; means for detecting the presence of ringing signal corresponding to a call in the phone line to which the apparatus is connected; means for connecting to the phone line, in the presence of the ringing signal, one electric impedance element substantially equivalent to the impedance offered to the phone line by a conventional phone apparatus which phone set has been unhooked, thus closing the d.c. loop; means for automatically sending a confirmation tone from the called apparatus to the calling party in response to the closure of the d.c. loop; means for detecting the reception, through the phone line, of a preset code and presenting at its output a validation signal in response to the reception of said code; means capable of activating an automatic phone answering equipment and connecting it to the phone line in the absence of such validation signal; means capable of activating a device generating an audible warning signal and of activating code displaying means to display the received code; means capable of activating said automatic phone answering equipment and of connecting it to the phone line whenever a predetermined period of time has elapsed, during which the call has not been attended, and means for disconnecting the apparatus from the phone line when another predetermined period of time has elapsed after the connection of the automatic phone answering equipment, and provided the called party has not attended the call, and for opening the phone line d.c. loop.

In accordance with a second aspect of this invention apparatus, the same comprises:

means for detecting the presence of a ringing signal corresponding to a call in the phone line to which the apparatus is connected;

means for connecting to the phone line, in the presence of the ringing signal, one electric impedance element substantially equivalent to the impedance offered to the phone line by a conventional phone apparatus which phone set has been unhooked, thus closing the d.c. loop;

means for automatically sending one confirmation tone from the called apparatus to the calling party in response to the closure of the d.c. loop;

means for detecting the reception, through the phone line, of a preset code and presenting at its output a validation signal in response to the reception of said code;

means capable of activating a first automatic phone answering equipment and of connecting it to the phone line in the absence of said validation signal;

means capable of activating a device to generate an audible warning signal and of activating a code displaying means to display the received code;

means capable of activating a second automatic phone answering equipment and of connecting it to the phone line whenever a predetermined period of time has elaspsed, during which a validation signal has been produced, but the telephone has not been attended; and means for disconnecting the apparatus from the phone line whenever another predetermined period of time has elapsed after the connection of any such automatic phone answering equipments and provided the called party has not attended the call, and for opening the phone line d.c. loop.

In accordance with a third aspect of this invention apparatus, the same comprises;

means for detecting the presence of a ringing signal corresponding to a call in the phone line to which the apparatus is connected;

means for connecting to the phone line, in the presence of the ringing signal, one electric impedance element substantially equivalent to the impedance offered to the phone line by a conventional phone apparatus which phone set has been unhooked, thus closing the d.c. loop;

means for automatically sending a confirmation tone from the called apparatus to the calling party in response to the closure of the d.c. loop;

means for detecting the reception, through the phone line, of a preset code and for presenting at its output a validation signal in response to the reception of said code;

means capable of activating a first automatic phone answering equipment and of connecting it to the phone line in the absence of said validation signal;

means capable of activating a device generating an audible warning signal, and of activating code displaying means to display the received code;

means capable of activating, in accordance with the received code, one predetermined automatic phone answering equipment from a plurality of automatic phone answering equipments and of connecting them to the phone line whenever a predetermined period of time has elapsed, during which a validation signal has been produced, but the phone receiver has not been attended; and means for disconnecting the apparatus from the phone line whenever another predetermined period of time has elapsed after the connection of any such automatic phone answering equipments, and provided the called party has not attended the call, and for opening the phone line d.c. loop.

The invention shall be best understood through the following description of one embodiment thereof, which shall be referred to the accompanying drawings.

Figure 3:
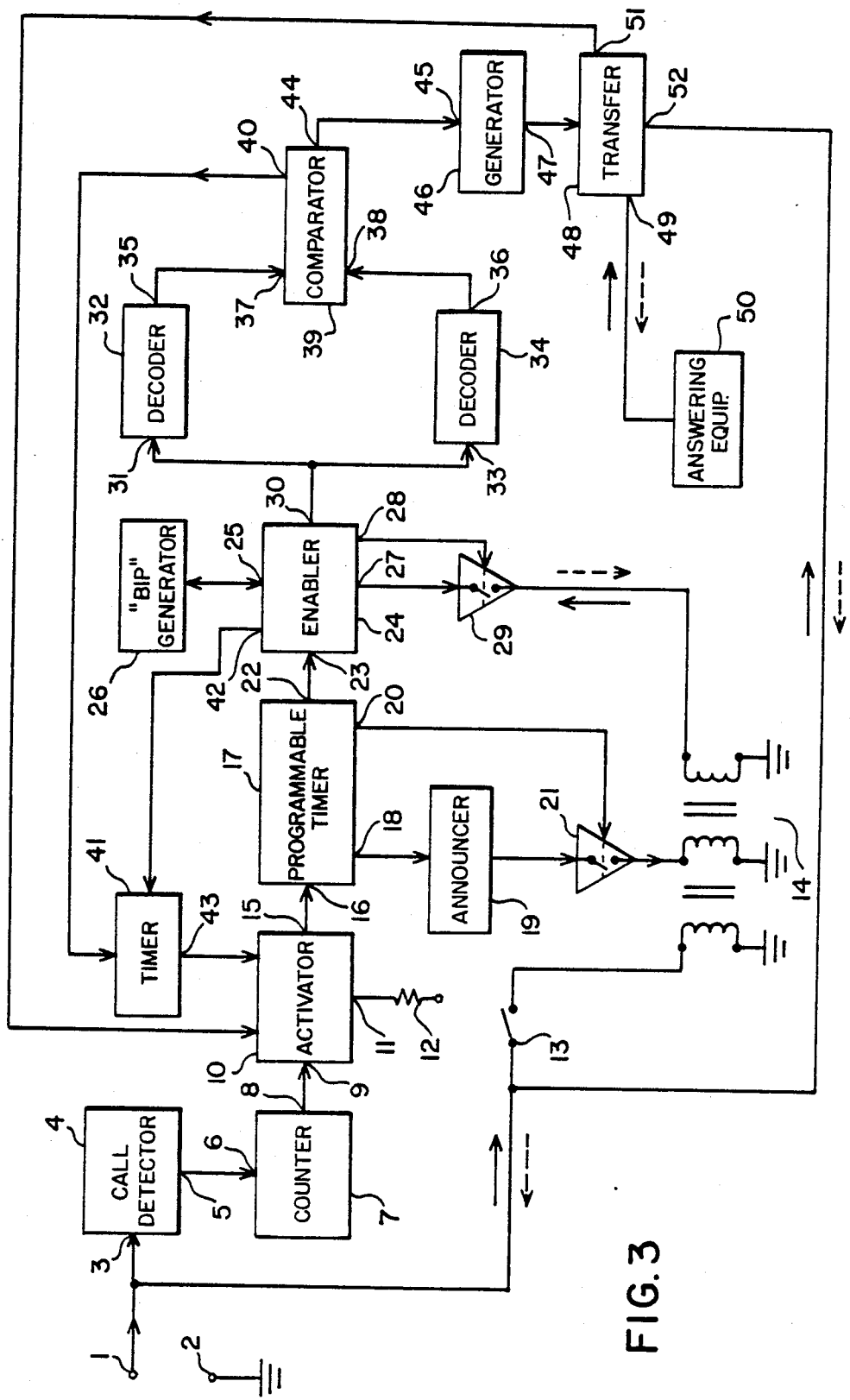
FIG. 3 is another variant of the device for recording messages and preventing the recording which is lost when no message is sent (time which is also lost when you have to check messages on the recorded tape and which have not been issued by the calling party).
Figure 4:
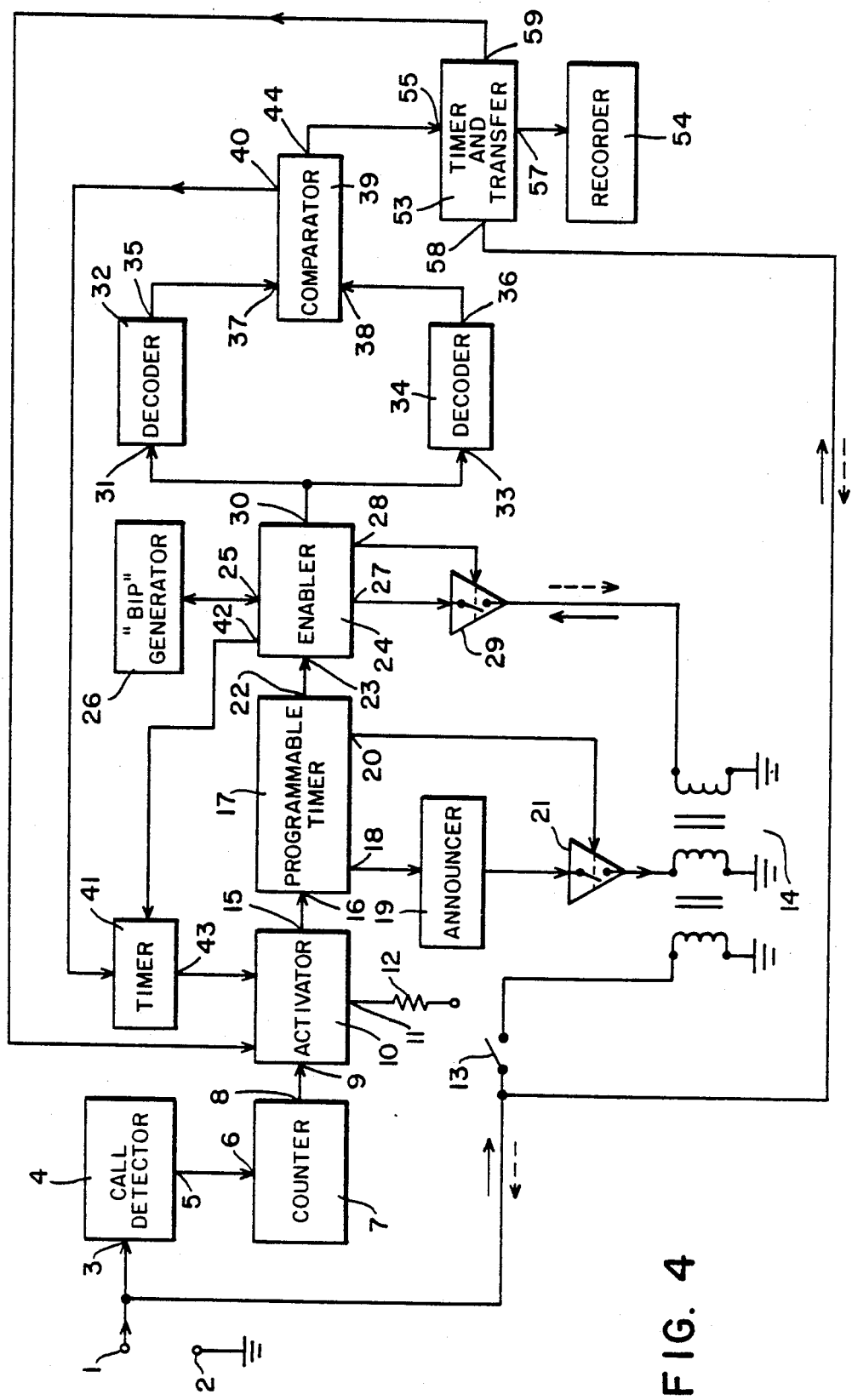
FIG. 4 is a variant of FIG. 3, wherein the automatic phone answering equipment is replaced by a magnetophonic tape or solid state recording device, a component conforming an automatic phone answering equipment.
Figure 6:
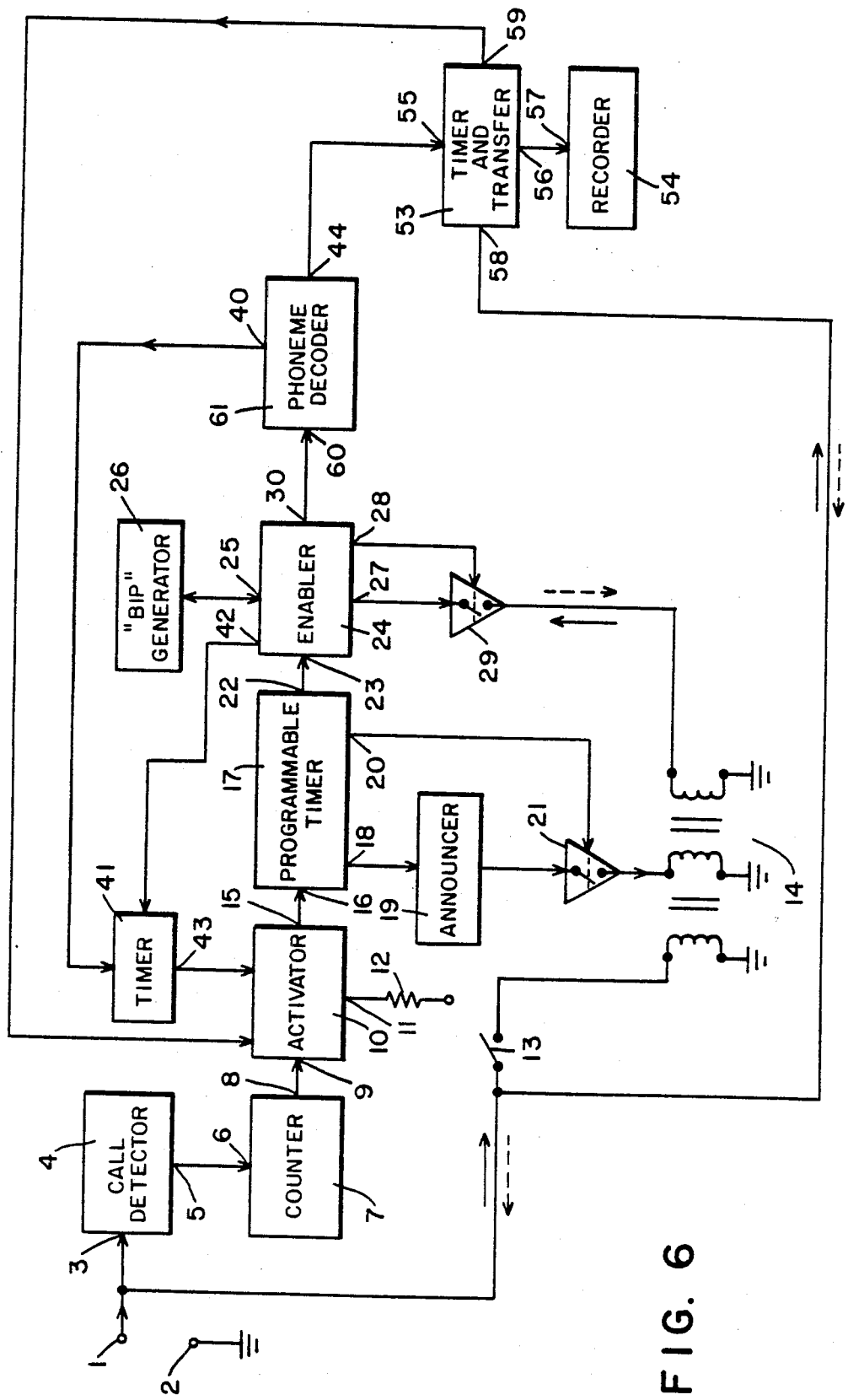

Finally FIG. 6, corresponds to another variant wherein said decoders of FIGS. 3 and 4 have been replaced by a phoneme decoder.

In order to simplify the construction of the circuit diagram of FIGS. 3,4,5 and 6, the same has been represented in every case by means of a block series.

Figure 1:
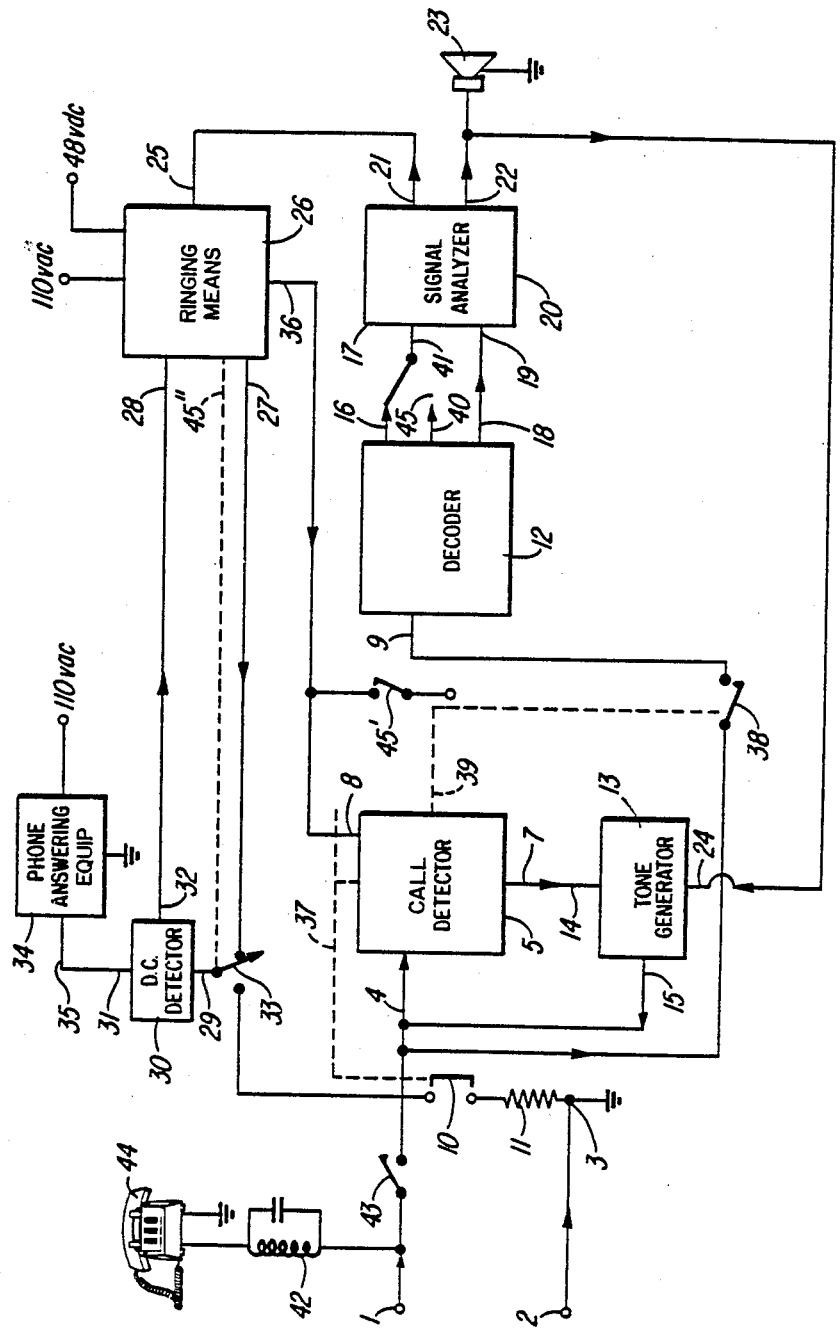
FIG. 1 is a block diagram illustrating the essential principles of the invention, allowing a better explanation of the apparatus thereof.
Figure 2:
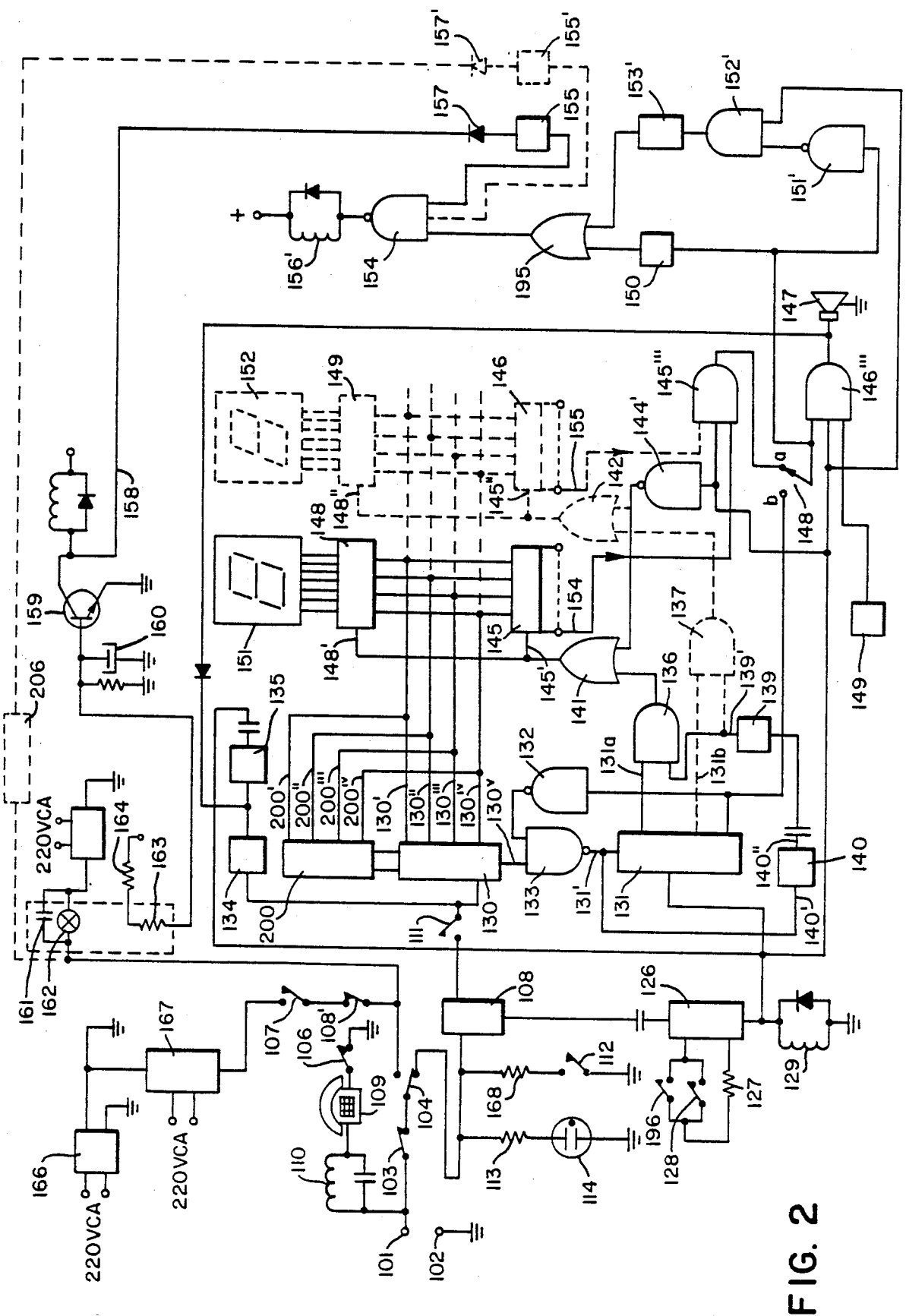
FIG. 2 is a schematic circuit diagram, partially in block form, illustrating the detailed circuit of a preferred embodiment wherein the dotted lines show the above mentioned variants.

In turn, said blocks are coincident with those of the main figure (FIG. 1) and those detailed in FIG. 2.

On the other hand, and in order to standardize the explanation of the operation and identification of the features of the employed means, these have been designated with the same numerals in FIGS. 3,4,5 and 6.

The arrows appearing at the interconnection of the blocks show the itinerary followed by the signals.

DETAILED DESCRIPTION OF THE PREFERRED EMBODIMENT

In FIG. 1, it can be seen that the apparatus of the present invention comprises two input terminals 1 and 2 which will be connected to the phone line. Terminal 2 may be connected to the common ground connection of the circuit, but being ground-insulated. The alternate ringing signal coming from the phone exchange enters input 4 of call detector 5; the latter can receive one or more calling pulse trains that number of pulse trains being adjustable and from there, through its output 37, it activates a relay which normally open contact 10 connects, in parallel with the phone line, one resistor 11 which value equals the impedance offered by a phone apparatus having its phone set unhooked.

Call detector 5, through its output 7, produces a pulse which duration may be, for example, one second. Said pulse enters through input 14 of the tone confirmation generator 13 which may be, for example, of 1,050 Hz.

In turn, through its output 15, generator 13 sends the confirmation signal to input 1 of the phone line, this signal being conceived to advise the calling party that he has been attended by the apparatus. Thereafter, with a delay of 0.5 seconds, detector 5 activates, through its output 39, a relay which normally open contact 38, connects the phone line to input 9 of the code decoder and validator 12. The latter is so arranged that it allows the admission of at least one validated and preselected code of recognizable signals constituting a code of as many characters as those for which the apparatus may be prepared.

Through input 9 of decoder 12, the signals sent by the calling party phone apparatus through the phone line are received. In case the calling phone generates a character or characters validated by 12, the latter offers a positive logic output at its output terminals 16 and 18. These outputs are coupled to terminals 41 (through the validated or complete code switch 45) and 19, corresponding to signal analyzer 20. The latter has an output 22 intermittently activating the piezoelectric siren 23, conceived to advise the called party that there is an entering phone communication with a validated code. Said logic signal enters input 24 of the tone confirmation generator 13, connecting to the phone line the above signal, conceived to advise the calling party that sent code has been accepted by the apparatus simulating an artificial ring-back.

Thereafter, there are two possibilities:

(a) if the called party answers phone 44, upon unhooking the receiver, relay 42 will be activated disconnecting, through its normally closed contact 43, the apparatus from the phone line and, through its normally open contact 45', resetting the system.

If the called party does not answer the call, analyzer 20 through its output 21, activates, after 30 seconds time for example, output 25 of the activating call circuit of automatic phone answering equipment 34. The latter through its output 45", activates a relay which, through its contact 33, allows the passage of calling signals from output 27 to phone answering equipment 34, through detection means 30. Ringing signals are constituted by a.c. and d.c. currents similar to those of a conventional phone call. As soon as detector 30 detects the passage of d.c. current through answering equipment 34, it sends, through its output 32, one blocking signal entering input 28 of the artificial ringing means 26, interrupting the ringing signals thus producing the activation and switching of relay 33 to the connection of the phone answering equipment to the phone line input.

At the same time, the artificial ringing means 26, through their output 36, send a disconnection signal to input 8 of detector 5, producing the releasing of the apparatus of the entering phone line. The automatic phone answering equipment shall continue working by itself; then, once its normal cycle has finished, it will be disconnected from the phone line. Once this has happened, sensor 30 detects this condition by sending through its output 32, a signal which, being applied to input 28 of the artificial ringing means 26, returns, through its output 45", to relay 33, connecting it in its normal position.

(b) If phone set operated by the calling party does not send a code, or sends a non-preset code, decoding means 12 will offer, at its output, a logic signal opposite to that of the previous case which, upon entering input terminals 41 and 19 of the analyzing means 20, activates a delay of, e.g. 5 seconds which, upon completing its cycle, activates only output 21 being coupled to input 25 of the artificial ringing means 26, the process taking place in the same way as explained for the case of signals being received with a validated or preset code.

Another possibility of activating the apparatus of this invention is offered if the calling party sends a complete code of as many characters as those for which the apparatus has been programmed.

In this case, the analyzing circuit 20 acts in the same conditions as if a validated code had been received, provided switch 45 is connected between 40 and 41. When switch 45 is in position 40, the apparatus shall consider as a validated code any code having the same amount of characters as those for which it is programmed, and shall consider as false the conditions of non-reception of code or the reception of a code having less characters as those for which it is programmed. The diagram shows phone set 44 as included in the apparatus of the present invention.

If the called party decides to answer directly the phone call in any stage of the process performed by the apparatus, upon lifting the receiver relay 42 shall be activated disconnecting, through the normally closed contact 43, the apparatus phone line, the latter being reset through the normally open contact 45'.

FIG. 2 shows in detail the circuit of the preferred embodiment with its variants shown in dotted lines. The phone line is connected to terminals 101 and 102 of the apparatus. Terminal 102 may be connected to the common ground connection of the circuit, but it must be insulated from the equipment ground connection. The alternate ringing signal coming from the phone exchange enters through the normally closed contact 103 of relay 110 (which remains in that state when the receiver of the phone apparatus 109 is hooked), passes through the shifting contact 104 of relay 158 (normally deactivated) and activates (Block 108) an optocoupler producing a level difference being applied to delay means consisting of one capacitor and one resistor with the object of storing, for example, two ringing signal trains. This information is coupled to the input of a Schmitt trigger generating a voltage which triggers the monostable 126. Said monostable has a time constant of, e.g. 50 seconds, and its output activates one relay 129, enabling at the same time counter 131 and gates "AND" 145''' and 146''', and also unblocking memories 145 and 146 through inverter 144' and "OR" gates 141, 142 . . .

At the same time, through the normally open contact 112 of relay 129, it grounds one resistor 168 having a similar value as the impedance of a phone apparatus having its receiver unhooked, thus causing the exchange to cease sending the ringing signal while the phone conversation is taking place.

The phone line remains connected to decoders 130 and 200 through the normally open contact 111 of relay 129. At the same time the output of monostable 126 triggers the monostable 135; the latter energizes the tone oscillator 134 during, for example, 1 second. This tone is applied to the phone line with the object of advising the calling party that he has been attended by the apparatus.

If, as from that moment on, the calling party sends preset code signals by means of a "Touch-Tone" or multifrequencies system keyboard, the characters of this code shall be decoded by means of decoder 130, the binary information corresponding to the received character appearing through its outputs 130' to 130''''. Simultaneously, the "Rotary" 200' system decoder remains annulled and its outputs 200' to 200'''' shall be floated ("tri-state"). If, on the other hand, the calling party sends his information by means of the "rotary" pulses system, decoder 200 shall offer through its outputs 200' to 200'''' the binary information corresponding to the character received.

Simultaneously, the "Touch-Tone" system decoder shall be annulled and its outputs 130' to 130'''' shall be floated ("tri-state"). The binary information decoded by any of the mentioned decoders shall be applied to the inputs of memories 145,146 . . . and to the decoding memories of seven segments 148, 149 . . .

Simultaneously with the binary information a high state will appear through 130′′′′′ which, applied to gate "NAND" 133 together with that received through reverser 132, will make a low state appear through clock input 131. At the same time, monostable 140 receives that state through its input 140′ and, through its output 140″ and after a delay of approximately 10 milliseconds, a low state will appear which triggers the monostable 139 which, through its output 139′, will send a high state during, for example, 10 milliseconds, said high state enabling during said period of time gates "AND" 136, 137 . . .

Counter 131 is of the decimal output type. As it was originally in position 0, there will be a high state in its output 131a which, applied to 136 together with the high state received through 139′, will make a high state appear through 136, said high state passing through gate "OR" 141, enabled through inverter 144′ and being applied to the transference inputs of memories 145′ and 148′ . . . In that way, the received character shall remain stored in both memories, thus appearing on the displaying device 151 and the corresponding output 154 of decimal output memory 145 being left activated.

When the calling party stops sending the character, the "any data" output 130′′′′′ shall pass to a low state, a high state appearing in 131′, thus making 131 advance one step. If new characters are received, they will remain stored in the manner described, in 146, 149 . . . , the received code being displayed on the displaying devices 151, 152 . . . .

After the third character is received through 131d, a high state will appear which, reversed through 132, will block 133, preventing new characters to be memorized. Thereafter, three possibilities are likely to happen:

(a) the calling party does not send any code or sends an incomplete code. In this case, and gate 152′ will receive a high state through its two inputs, thus applying a high level to the input of timer 153′ of, for example, 5 seconds, which output after said time having elapsed, will offer a high state that, passing through gate "OR" 195, will enable one of the inputs of gate "NAND" 154. The latter through its other input, receives an interrupted high state coming from the square wave generator 155 producing, at the output of 154, the appearance of a low state which excites relay 156′ in an alternate manner. The latter, through its normally open contact 107, sends to the automatic phone answering equipment input 165 one signal consisting of a.c. and d.c. currents similar to those of a conventional phone call and which are generated by the d.c. current source 166 and the a.c. current source 167.

When 165 "answers", a d.c. current will flow through lamp 162 producing the activation of the optocoupler formed by lamp 162 and photoresistor 163, applying a positive voltage to the base of transistor 159 which, after a delay produced by capacitor 160, will excite relay 158 and through diode 157, will deactivate generator 155.

Relay 158, on one hand, through its normally closed contact 108′, disconnects the phone answering equipment 165 from the artificial ringing source and, through its reversing contact 104, connects the automatic phone answering system directly to the phone line input. In turn, its normally open contact 196 connects one resistor 127 to the monostable 126, causing the same to rapidly finish its cycle and producing the apparatus general resetting.

Upon completion of its normal cycle, the automatic phone answering system shall be disconnected, causing lamp 162 to be turned off, deactivating relay 158 and re-establishing the original connection of the system;

(b) the calling party sends a complete code (consisting of as many characters as those for which the apparatus is prepared). Switch 148 is in position b. Once the code has been completed, a high state will appear through output 131d of counting means 131 which is to be applied through 148, to one input of and gate 146.

Through another of its inputs, gate 146 receives a high state coming from the monostable 126 and, through a third input, receives the intermittent high state coming from the astable 149. Through the output of 146, an intermittent high state will appear activating, on the one hand, the piezoelectric siren 147 and, on the other, the confirmation tone generator 134, which advises the calling party that his code has been accepted.

Simultaneously, through the input of timer 150, which is for example a 30-second timer, a high state will show up which, if phone apparatus 109 is not attended by the called party, it will produce, after that period of 30 seconds has elapsed, the appearance of a high state at the output of timer 150, which will activate the automatic phone answering equipment 165 in the same manner as described in (a).

If, on the other hand, phone 109 is attended, by having current passing through relay 110, the latter shall be activated and, by means of its normally closed contact 103, it will disconnect the equipment from the phone line and, through its normally open contact 128, will cause the monostable 126 to return to stable position rapidly, thus resetting the entire apparatus.

(c) The calling party sends a complete code and switch 148 is in a position a. In such a case, there are two possibilities:

(1) the received code is not the one selected by means of switches 154 and 155. In this case, a low state will appear at the output of 145, keeping 146 blocked. This same state will activate timer 153′ of, for example, 5 seconds, through reverser 151′ and gate "and" 152′, producing the activation of the automatic phone answering equipment in the manner described in (a).

(2) The code coincides with that being pre-established. In this case, 145 will receive a high state in three of its inputs which, added to that of the monostable 126 will produce in its outputs the appearance of a high state which, on one hand, activates gate "AND" 146 and produces the local acoustic signal through 147 and the return of the confirmation tone through 134. The high state present at 145 will activate timer 150 which, provided the phone apparatus 109 is not answered within the 30-second period of time, will produce at the output a high state activating the automatic phone answering equipment 165 in the manner described in (a).

FIG. 3 is another variant of the apparatus for recording messages and preventing the recording being lost when no message is sent; reviewing in detail its operation we observe that the phone line is connected at terminals 1 and 2 of the apparatus; terminal 2 may be connected to a common point or return, but insulated from the apparatus ground connection. The phone call signal or ringing signal coming from the phone exchange originated by the action of a calling user enters device 4, calling trains detector, through its input 3. This device is composed of an optocoupler element, sensitive to the alternate current of the calling trains generated by the exchange.

Through its output 5, detector 4 generates a logic signal which enters through input 6 to device 7, comprising one pulse or calling train counter, capable of detecting at least a ringing train. Device 7, once it has completed or accumulated the amount of trains for which it has been programmed, generates at its output 8 one signal which enters at input 9 of device 10. The same, by means of its output 11, activates relay 12, which normally open contact 13 connects the line to the primary transformer 14, producing the closure or "attention" of the phone loop and, therefore, the cease on the part of the exchange, of the calling or ringing signal sending.

The primary of transformer 14 has an impedance approximately equal to one reflected over a phone line by a phone apparatus with its receiver unhooked. Simultaneously, device 10 activates, by means of its output 15, input 16 of device 17, which comprises one programmmable timer, which activation time shall be dependant from the characteristics of the announcing element 19.

Activation of device 17, on one hand, through its output 18, puts announcer 19 in operation, which may be composed of an endless magnetophonic cassette reproducer, or else a solid state vocal memory; and on the other, its output 20 activates the switch to solid state 21, allowing the vocal announcement to be transferred to the phone line through one of the secondaries of transformer 14.

The essence of this function consists in alerting the calling user that he has been attended by a phone line having an automatic answering equipment, advising him that, if his intention is to leave a recorded message, he should send a specific digit or character after listening to the characteristic "bip" signal.

Time or duration with which the timer 17 is to be programmed will set the times or "broadcasts" of the vocal announcement which are to be considered necessary so that the calling party understands the use of the mechanism he is facing.

After that time is completed, device 17 will deactivate announcer 19 and will open switch 21 and, simultaneously, through its output 22, will activate input 23 of device 24 which comprises an enabling system for the entrance of the codification signals that the calling party will emit.

Device 24, already enabled, will activate, through its output 25, the audible signal ("bip") generator 26 previously announced, and simultaneously through its output 27, will release this signal to the solid state switch 29, which, activated through output 28 will connect the signal to another secondary of transformer 14 and from there to the phone line and, therefore, to the apparatus of the calling user.

During the emission of the "bip" audible signal, device 24, by means of the output 30, places decoders 32 and 34 in resetting position, and after said signal is finished, by means of the output 42, it will activate one timer 41. The latter can be programmed in a time of at least 5 seconds, and its function shall be understood in the next step.

As from this moment, the behavior of the apparatus shall be dependant from the action by the calling party about sending or not the established code. If code sent by the calling party is the valid or established one, or if it has been emitted by pure or combined, continuous or interrupted tones or frequencies-type generators, for example, multifrequencies as those utilized by the DTMF ("Touch-Tone") or Data Systems, the same shall be decoded by 34 which, through its output 36, will activate input 38 of comparator 38 which in turn, by means of its output 40, will deactivate timer 41.

If, on the other hand, the user sends no code, makes a wrong sending, or else gives up continuing the operation by hanging the set of his apparatus, the lack of a validated signal at the output 40 of comparator 39 will cause the timer 41, once the time for which it has been programmed is over, to send a switching off signal through its output 43 to device 10 which in turn, through its output 11, will deactivate relay 12 which contact 13, upon changing to its rest position, will uncouple the phone line from the apparatus.

That being previously explained shall be accomplished in the same way if the calling party performs the sending of pulses by means of his telephone disk, for which purpose the audio pulses corresponding to the dialing shall be decoded by device 32.

If the dialed code has been validated by comparator 39, the same, through its output 44, shall activate output 45 of device 46 which comprises a generator of artificial phone call trains. This last device generates the a.c. and d.c. signals destinated to start the automatic phone answering system 50. The artificial calling signals previously enter device 48 consisting of a transfer mechanism which, when detecting the attention or closing state of the loop of answering equipment 50, will deactivate the above mentioned signals (artificial), coupling the phone line to the automatic answering equipment, which enters device 48 through its input 52.

Simultaneously, mechanism 48, through its output 51, will send a switching off signal to device 10, which will deactivate relay 12 and, therefore, it will uncouple the phone line from the apparatus. Once the operation cycle of the automatic phone answering equipment is completed, the same, upon being stopped or uncoupled from the phone line, shall cause the transfer device 48 to be returned to its rest position, thus allowing the apparatus the reception of a new call.

Describing now the operation of what is being represented by FIG. 4, the announcement stage is identical to that of FIG. 3 (automatic answering, announcement, etc.). In this block diagram, the automatic phone answering equipment 50 of FIG. 3, has been replaced by the magnetophonic tape or solid state recording stage or device, member of an assembly conforming an automatic phone answering equipment.

As from the moment a validated code enters the comparator 39, the same, through its output 44, will activate input 55 of device 53. It comprises: one "n" seconds programmable timer, one starting switching system intended for starting recorder 54 and one transfer mechanism intended for coupling the phone line to the recorder input. Device 53, at the time it is activated, will deactivate device 10 through its output 59 and, as it was explained in the specification corresponding to FIG. 1, it will uncouple the phone line from the apparatus.

Simultaneously, its output 58 will couple the phone line to recorder 54, by means of its output 57. Once the time for which device 53 has been programmed is over, the same will uncouple or deactivate recorder 54 and shall uncouple the phone line thereof, allowing the apparatus to be in disposition to receive a new call.

Figure 5:
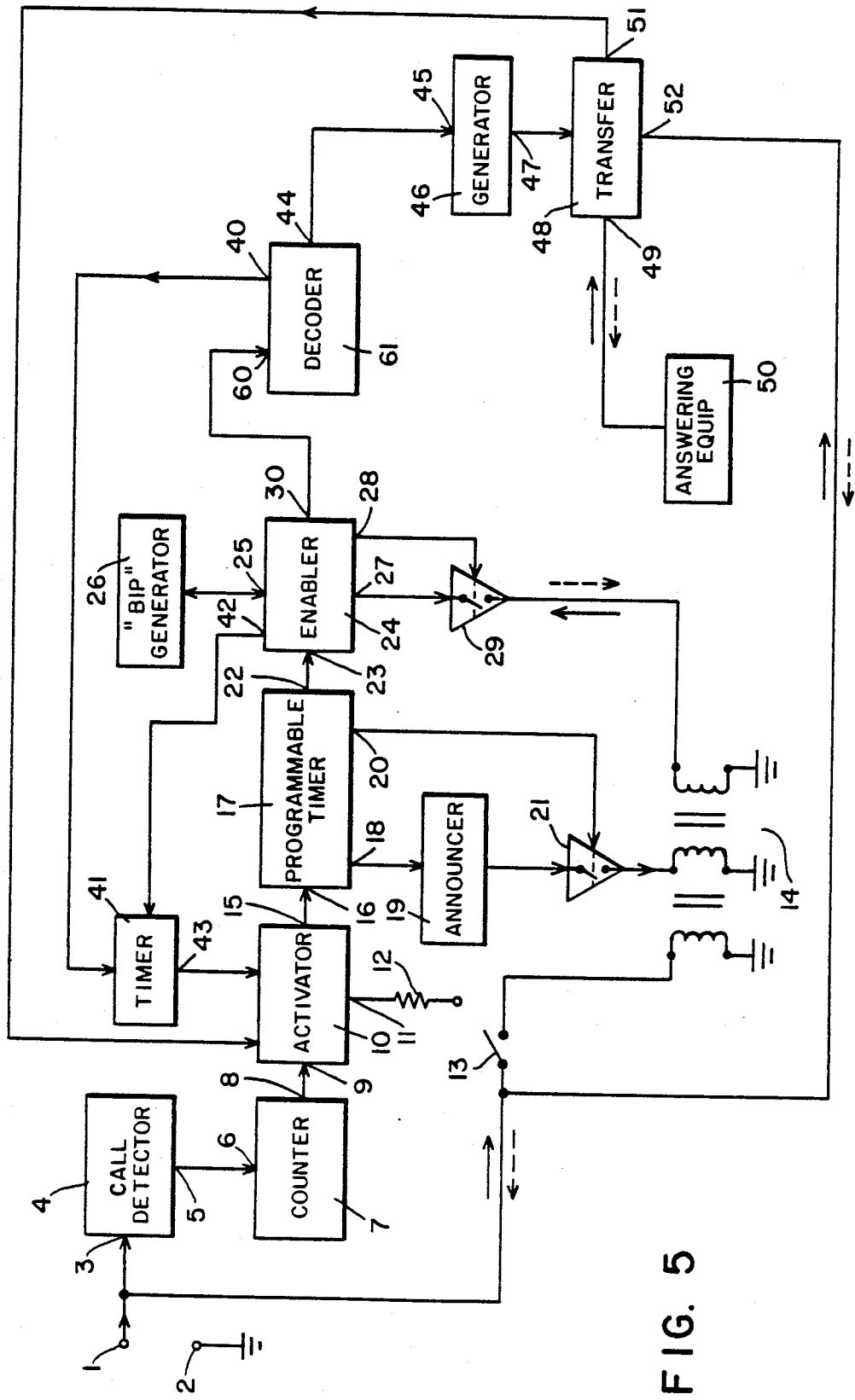
FIG. 5 is another variant wherein decoders of FIGS. 3 and 4 have been replaced by a device capable of decoding sounds, syllables or words.

The block diagram of FIG. 5 shows the replacement of decoders 32 and 34 for one device capable of decoding sounds, syllables or words, 61. If the signal decoded by device 61 corresponds to the one being validated, the same, through its output 40, will deactivate timer 41 and, through its output 44 will activate devices 46,48 and 50 in the same way as described in FIG. 3.

Finally, in FIG. 6, decoders 32 and 34 are replaced by the phoneme decoding device 61, the remaining features and operation being identical to those described with reference to FIG. 4.

Such as the method has been explained and one embodiment of the apparatus has been described in detail in order to put it into practice, the experts in the art will easily understand that some changes and component substitutions could be made therein which, however, will remain within the real spirit and scope of the invention as defined in the enclosed claims.

What is claimed is:

1. A method for operating, through a phone line, one of a plurality of automatic phone answering devices, wherein the method comprises the steps of:
   (A) sending from the calling end of said phone line characters corresponding to the phone number of the called party;
   (B) detecting at the called end the pulse trains generated by the phone exchange;
   (C) closing automatically and electrically the d.c. loop at the called end, connecting in parallel with said phone line an electric impedance means equivalent to the impedance offered to said phone line by a conventional phone which has an unhooked phone set;
   (D) in response to the closure of the d.c. loop, sending automatically a confirmation tone from the called apparatus to the calling one;
   (E) after closure of the d.c. loop, or if no code has been received, or else, an incomplete code, from the calling party within a predetermined period of time, activating at the called end said one automatic phone answering equipment and connecting it to said phone line and, if a code has been received from the calling party within said predetermined period of time, emitting one audible warning signal if the received code is the preset one, and exhibiting said complete code received at the called end without yet connecting the automatic phone answering equipment;
   (F) if, after a second predetermined period of time has elapsed, the called party has not attended the call, automatically activating the automatic phone answering equipment and connecting it to said phone line; and
   (G) when another predetermined period of time has elapsed, the called party not having answered, automatically opening the d.c. loop.

2. The method of claim 1, wherein, after the steps (A), (B), (C) and (D), the method comprises the additional steps of:
   (E) after the d.c. loop closure and if no code has been received, within a predetermined period of time from the calling party, or if an incomplete or an unvalidated or nonpreset code has been received, activating at the called end said one automatic phone answering equipment and connecting it to said phone line and, if a preset or validated code has been received from the calling party within said predetermined period of time emitting an audible warning signal, and displaying said received code at the called end without connecting said one automatic phone answering equipment;
   (F), if, when a second predetermined period of time has elapsed, the called party has not attended the call, automatically activating a second automatic phone answering equipment and connecting it to said phone line in response to the preset received code and;
   (G) when another predetermined period of time has elapsed, the called party not having answered the call, automatically opening the d.c. loop of the phone line.

3. The method of claim 2, wherein, after steps (A), (B), (C), (D) and (E), the method comprises the additional steps of:
   (F) if, after a second predetermined period of time, the called party has not answered the call, automatically activating a third one of a plurality of automatic phone answering equipments and connecting it to said phone line, in accordance with the preset code which has been received, and:
   (G) when another predetermined period of time has elapsed, the called party not having answered the call, automatically opening the d.c. loop of the phone line.

4. The method of claim 1, wherein, after steps (A) (B) and (C), the method comprises the additional steps of:
   (D) in response to the closure of the d.c. loop, activating at the called party one announcing means alerting the calling party of the operating mode of the apparatus;
   (E) after alerting announcement is finished and after the calling party listens to a signal or "bip", the latter sending a code;
   (F) if said code is the preset or validated one, generating artificial call pulse trains which activate said one automatic phone answering equipment coupled to said phone line and which continues to be active for a predetermined time, and;
   (G) said predetermined time having elapsed, resetting the apparatus, such that said apparatus is disposed to receive another call.

5. The method of claim 4, wherein, after steps (A), (B), (C), (D) and (E), the method comprises the additional steps of:
   (F) if the calling party sends no code, or any unvalidated code within a predetermined time, opening the d.c. loop without the automatic phone answering equipment being started to lessen the recording time.

6. The method of claim 1, wherein, after steps (A), (B), (C) and (D), the method comprises the additional steps of:
   (E) after closure of the d.c. loop, the calling party sending an appropriate code to said one automatic phone answering equipment;
   (F) the code sent by the calling party being received, and activating, at the called party's end, the corresponding automatic phone answering equipment, and;
   (G) after a predetermined time of message recording having elapsed, opening the d.c. loop, said one automatic phone answering equipment being deactivated and in disposition to receive and record another message.

7. The method of claim 1, wherein the code sent by the calling party is sent by rotatably dialing a rotary phone apparatus.

8. The method of claim 7, wherein the code sent by the calling party includes multifrequency tones.

9. The method of claim 7, wherein the code sent by the calling party is produced by a multifrequency generator applied to the microphone of said phone apparatus.

10. The method of claim 7, wherein the code sent by the calling party is a phoneme externally applied to the microphone of said phone apparatus.

11. The method of claim 7, wherein the code sent by the calling party includes at least one vowel or one syllable emitted in front of the microphone of said phone apparatus.

12. An apparatus to operate, through a phone line, one of a plurality of automatic phone answering equipment comprising:
   means for detecting the presence of a ringing signal corresponding to a call-in on said phone line coupled to the called apparatus;
   means for connecting to said phone line, upon detection of the ringing signal, an electric impedance element substantially equivalent to the impedance offered to said phone line by a conventional phone which has an unhooked receiver to close the d.c. loop;
   combination means for sending a confirmation tone from the called apparatus to the calling party upon the closure of the d.c. loop;
   means for detecting the reception, through said phone line, of a preset code and for presenting at its output one validation signal in response to said code;
   first means for activating said one automatic phone answering equipment and for connecting it to said phone line in the absence of said validation signal;
   second means for activating an audible warning signal generator and for activating code displaying means to display the received code;
   third means for activating said one automatic answering equipment and for connecting it to said phone line when a predetermined period of time has elapsed and when the call has not been attended; and,
   means for disconnecting said called apparatus from said phone line when another predetermined period of time has elapsed, after the connection of said one automatic answering equipment and if the called party has not attended the call, and means for opening the d.c. loop of said phone line.

13. The apparatus of claim 12, wherein it further comprises: means for activating a second one of said plurality of automatic phone answering equipment and for connecting it to said phone line when a predetermined period of time has elapsed, during which a validation signal has been produced, but said called apparatus has not been attended; and means for disconnecting said called apparatus from said phone line when another predetermined period of time has elapsed after the connection of any of said automatic phone answering equipments, and if the called party has not attended the call, actuating means for opening the d.c. loop of said phone line.

14. The apparatus of claim 12, wherein it further comprises means for activating, in accordance with the received code, one predetermined equipment from said plurality of automatic phone answering equipment and for connecting it to said phone line when a predetermined period of time has elapsed within which a validation signal has been produced, but said called apparatus has not been attended; and means for disconnecting said called apparatus from said phone line when another predetermined period of time has elapsed after the connection of any one of said plurality of phone answering equipments if the called party has not attended the call, and means for opening the d.c. loop of said phone line.

15. The apparatus of claim 12, wherein it comprises a call detector with a first detecting input connected through a first normally closed contact in series with said phone line, said electric impedance element equivalent to that of an unhooked phone connected between said fist detecting input and in series with a second normally open contact, the closure of said second contact closing the d.c. loop of said phone line, said call detector having a second input connected to a first output of a call activator of said one automatic phone answering equipment; said call detector having three outputs, one detector output linked with said second contact, another detector output linked with a third contact connecting said first detector input with the input of a code decoder and validator, and the third detector output linked to a confirmation tone generator; said confirmation tone generator having an output connected to said first detector input of said call detector and one input of said confirmation tone generator connected to a first output of a signal analyzer; said code decoder and validator and said signal analyzer reciprocally interconnected through a validated code switch; said first output of said signal analyzer is connected to a sound means; said signal analyzer, through a second output, is connected to a first input of said call activator of said one automatic phone answering equipment; said call activator having a second input connected to the output of at least one detector, said at least one detector having one first output connected to said one automatic phone answering equipment and to means for actuating a switch being in control connection with a second output of said call activator of said one automatic phone answering equipment; a first switch contact connected to a second output of said call activator of said one automatic phone answering equipment and a second switch contact connected to said first detector input of said call detector; a resetting contact between said second input of said call detector and ground; a relay having a winding thereof connected in series with one of the terminals of a phone apparatus associated with one pair of contacts which when said phone apparatus is unhooked, disconnects said first detector input of said call detector from said phone line such that said phone apparatus is disposed to operate normally.

16. The apparatus of claim 12, wherein it comprises an optoelectronic detector which input is coupled to the phone net and its output to the input of a pulse counter; the output of said pulse counter being connected to a first input of one activator means which, through a first activator output, is connected to a relay associated with one contact in open position in series between the phone net input and one first transformer winding; a second activator output coupled to the input of one programmable timer which has a first programmable timer output coupled to the input of an enabler means for admitting code signals, a second programmable timer output coupled to an announcing means and a third programmable timer output coupled to the control input of a first solid state switch; said first solid state switch having an input connected to the output of said announcing means and having an output connected to a second winding of said transformer; said enabler means for admitting code signals having one first enabler output connected to the input of a second solid state switch which output is connected to a third winding of said transformer and a second enabler output connected to the control input of said second solid state switch; a third enabler output connected to the triggering input of another timer; a fourth enabler output connected to the control input of an audio signals generator, and a fifth enabler output connected to the input of a first and a second decoder; the outputs of said first and second decoders connected respectively to the inputs of a comparator; said comparator having a first output connected to the input of said another timer and the output of said another timer connected to a second input of said activator; a second output of said comparator connected to the input of an artificial call pulse train generator; the output of said artificial call pulse train generator connected to a first input of a transfer means; said transfer means having a first output connected to said one automatic phone answering equipment and having a second output connected to a third input of said activator and said transfer means having a second input connected to said phone line.

17. The apparatus of claim 16, wherein the first comparator output is connected to the input of a transfer and programmable timer means having one input connected to said phone line, one output of said transfer and programmable timer means connected to the said another timer and another output thereof connected to a recorder.

18. The apparatus of claim 16, wherein a sound, syllable or word decoder is coupled between the fifth enabler output of said enabler means and said first input of said transfer means; and one output from the word decoder is connected to one input of said another timer.

19. The apparatus of claim 16, wherein between the fifth enabler output of said enabler means and said first input of said transfer means is interconnected a phoneme decoder, and one output of said phoneme decoder is connected to one input of said another timer.

20. The apparatus of claim 12, wherein said means for sending one confirmation tone comprise, at least, one frequency generator generating a tone between 700 and 1500 Hz, which has one output connectable to said phone line; and a first input connected to the output of said means for detecting a ringing signal, and a second input connected to the output of a code signal analyzer.

21. The apparatus of claim 12, wherein said means for detecting the reception, through said phone line, of a preset code comprise one dialing rotary pulse decoder, one multifrequency tone Touch-Tone decoder, interconnected with a counter and gates to respective memories which are connected with decoders for signs of at least seven segments, to which are coupled at least one displaying device of seven segments.

22. The apparatus of claim 12, wherein said third means for activating said one automatic phone answering equipment and for connecting it to said phone line, comprise one reversing contact associated to a relay energized through an NPN transistor.

23. The apparatus of claim 12, wherein said second means for activating an audible warning signal and for activating code displaying means to display the received code, comprise at least one piezoelectric loudspeaker and at least one displaying device of at least seven segments.

24. The apparatus of claim 12, wherein said third means for activating said one automatic answering equipment and for connecting it to said phone line, comprise one a.c. current source associated with a d.c. current source for producing signals similar to the calling currents produced in the phone line.

25. The apparatus of claim 12, wherein said means for disconnecting the apparatus from said phone line comprise one reversing contact associated to one relay energized through an NPN transistor.

26. The apparatus of claim 15, wherein said sound means comprises at least one piezoelectric loudspeaker.

* * * * *

UNITED STATES PATENT AND TRADEMARK OFFICE
CERTIFICATE OF CORRECTION

PATENT NO. : 4,549,045
DATED      : October 22, 1985
INVENTOR(S) : Marcelo CASTRO et al.

It is certified that error appears in the above-identified patent and that said Letters Patent is hereby corrected as shown below:

On the front page, add

--Related U.S. Application Data
[63] Continuation-in-Part Serial No. 288,812, July 31, 1981--.

Signed and Sealed this

Thirteenth Day of May 1986

[SEAL]

Attest:

DONALD J. QUIGG

*Attesting Officer*       *Commissioner of Patents and Trademarks*

UNITED STATES PATENT AND TRADEMARK OFFICE
CERTIFICATE OF CORRECTION

PATENT NO. : 4,549,045

DATED : October 22, 1985

INVENTOR(S) : Marcelo Castro et al.

It is certified that error appears in the above-identified patent and that said Letters Patent is hereby corrected as shown below:

Column 2, line 53, change "priod" to --period--.
Column 4, line 28, change "ode" to --code--.
Column 8, line 56, change "200'" to --200--;
         line 69, change "148" to --D148--.
Column 9, line 5, change "131" to --131'--;
         line 22, change "154" to --ℓ154--;
         line 31, after "received" insert --,--, delete "," after "131d";
         line 36, change "and" to --AND--;
         line 43, change "154" to --G154--;
         line 45, change "154" to --NAND gate G154--;
         line 48, after "the" insert --input of the--, delete "input" on line 49.
Column 10, line 7, change "148" to --SW148--;
         line 10, after "through" insert --switch--, change "148" to --SW148--, change "and" to --AND--, change "146" to --146'''--;
         line 11, change "146" to --146'''--;
         line 15, change "146" to --146'''--;
         line 35, change "148" to --SW148--;
         line 38, change "154" to --supplied via lines ℓ154--;
         line 39, change "145" to --145'''--, change "146" to --146'''--;
         line 41, change "gate "and"" to --AND gate--;

UNITED STATES PATENT AND TRADEMARK OFFICE
CERTIFICATE OF CORRECTION

PATENT NO. : 4,549,045

DATED : October 22, 1985

INVENTOR(S) : Marcelo Castro et al.

It is certified that error appears in the above-identified patent and that said Letters Patent is hereby corrected as shown below:

```
           line 45, change "145" to --145'''--;
           line 47, change "outputs" to --output--;
           line 48, change "146" to --146'''--;
           line 51, change "145" to --145'''--.
Column 12, line 3, change "38" (second occurrence) to --39--;
           line 21, change "output" to --input--;
           line 39, change "rest" to --reset--.
Column 16, line 7, change "detecting" to --detector--;
           line 11, change "fist detecting" to --first
detector--.
```

Signed and Sealed this

Eighteenth Day of November, 1986

*Attest:*

DONALD J. QUIGG

*Attesting Officer*   *Commissioner of Patents and Trademarks*